3,787,555
PROCESS FOR RECOVERING CHROMIUM
VALUES FROM CHROME ORE
Charles Patrick Bruen, Bernardsville, N.J., and Christian Albert Wamser, Camillus, N.Y., assignors to Allied Chemical Corporation, New York, N.Y.
No Drawing. Filed Feb. 16, 1972, Ser. No. 226,931
Int. Cl. C01g 37/14, 49/00
U.S. Cl. 423—54
13 Claims

ABSTRACT OF THE DISCLOSURE

Chromium values from chrome ore are solubilized in an aqueous solution which comprises digesting the ore with an aqueous chromic acid solution at elevated temperatures to produce a solution of the dichromates of the metal values in the chrome ore, separating the digested solution from the insoluble material, oxidizing the trivalent chromium present in the digested solution to the hexavalent state, and recovering the chrome values. Oxidation of the chrome ore prior to the digestion step sufficient to oxidize at least 40% of the ferrous iron to the ferric state in the ore increases the dissolution rate of the metal values in the chrome ore.

BACKGROUND OF THE INVENTION (I) Field of the invention

This invention relates to the recovery of the chromium values of chrome ore.

(II) Description of the prior art

Chrome ore is generally processed on an industrial scale by high temperature alkaline roasting under oxidizing conditions. The sodium chromate formed is leached from the roast and converted to the dichromate by acid treatment, and further to chromic acid by another acid treatment. The final leached waste residue contains residual chromium and represents a disposal problem. Large amounts of sodium sulfate by-product are formed and must be marketed.

On a pilot plant scale, extractive procedures have been reported, generally based on the use of hot concentrated sulfuric acid together with small amounts of catalyst. These processes involve the separation of metal values in the ore as their sulfates, by the technique of partial crystallization, with a correspondingly large loss of sulfuric acid. Chrome products are obtained which generally require further purification before meeting the requirements of many industries.

SUMMARY OF THE INVENTION

Chrome ore such as "chromite" is digested in an excess of hot aqueous chromic acid to form the soluble dichromates of the metal values of the ore. The solution is separated from the insoluble residue and the dissolved trivalent chromium is oxidized to the hexavalent state, chemically or electrolytically. The cations present in the solution such as those of iron, aluminum and magnesium, which are also extracted during the digestion in the form of their dichromates, are adsorbed on an ion exchange resin or extracted from the solution by a liquid ion exchanger, yielding an aqueous chromic acid product. The chromic acid required for the digestion is recycled to the digestion step. The remaining chromic acid represents useful product which can be further processed to anhydrous chromic acid, sodium dichromate or to many other useful chromium products.

Thermal oxidation of at least part of the ferrous iron contained in the ore renders the ore more amenable to attack by the chromic acid, thus increasing the dissolution rate and the overall efficiency of the digestion step.

DESCRIPTION OF THE PREFERRED EMBODIMENTS

Although it has long been known that chrome ore may be digested with sulfuric acid, the introduction of the foreign sulfate radical into the digest liquor, the high costs resulting from the losses of this acid in the process, and the relatively impure product characteristics of the method of partial crystallization, all serve to render this route economically unattractive. Although the "alkaline roast" method is more economical, and consequently is presently the commercial method of extracting chrome values from chromite ore most commonly used, this method involves relatively high capitalization and maintenance costs because of the high temperature roasting equipment required, and the highly corrosive feed which must be processed.

We have now found, unexpectedly, that chrome ore can be very effectively digested with hot aqueous chromic acid alone, no additives being necessary. In view of the prior art, this is quite surprising. Since no foreign substances need be added, and a portion of the product can be recycled as the dissolving solution, the problems posed by earlier extraction methods are avoided.

The chromic acid dissolution route of the present invention also eliminates several weaknesses of the conventional roasting process, and offers an economic route to a very satisfactory product. The chrome ore is "opened" under comparatively mild conditions, i.e., by digestion with strong aqueous chromic acid at is normal boiling point (110° C.). High yields are attainable since undissolved ore can be recycled into the digestion step. The waste stream consists of a solution containing iron, aluminum, and magnesium from which residual chromium values can be efficiently removed by a variety of methods. One of the desired products (chromic acid) is generated directly while others such as sodium dichromate or chromate can easily be prepared by treating the chromic acid with the requisite amount of sodium carbonate. No by-products are produced.

The proposed process scheme is unique in that no foreign species are introduced into the ore-acid system.

In the preferred embodiment of the present invention, the chrome ore is ground, preferably to about 200 mesh or finer, and digested in hot aqueous chromic acid having a concentration within the range of about 25 to 60%, preferably about 45 to 55%. The temperature of the digestion is maintained between about 60° to 250° C. for from about 0.5 to 5 hours. At atmospheric pressure, it is convenient to keep the digestion at the boiling point which is about 110° C. for a 50% chromic acid solution. If desired, however, the digestion period can be shortened by carrying out the digestion in a pressure vessel at superatmospheric pressure. The amount of chromic acid required is desirably at least equivalent to that required to form the dichromate salts of the chromium and other metals in the ore, such as iron, aluminum, and magnesium. Preferably the amount of chromic acid should be sufficient to form the dichromates of all metals present in the ore, and to oxidize any divalent iron present to the trivalent state. Thus, for an ore containing 44.5% $Cr_2O_3$, 19.3% Fe, 15.4% $Al_2O_3$, and 10.7% MgO, 470 parts of $CrO_3$ are required per 100 parts of ore. This includes some additional $CrO_3$ consumed in oxidizing divalent to trivalent iron. In addition, an amount of chromic acid should preferably be added to provide an excess of at least about 5%, preferably between 5 and 20% as $CrO_3$ to solution. Of course some product will be obtained if the quantity of chromic acid is less than that indicated, but some chromates rather than dichromates would be formed. Since the chromates are generally less soluble than the metal dichromates, it follows that a loss in chromate values and therefore in yield, would accompany the separation of the insoluble fraction.

It has been found that the ore can be made more reactive by a prior thermal oxidation treatment, resulting in an increased dissolution rate in aqueous chromic acid. Thus, heating a typical chrome ore of composition: 44.6% $Cr_2O_3$, 16.3% $Al_2O_3$, 10.0% MgO, 2.5% $SiO_2$, 19.6% FeO, 6.3% $Fe_2O_3$ at 1000° C. in air for 2 hours results in oxidation of 90% of the FeO to $Fe_2O_3$, i.e., the oxidized ore composition is essentially that shown above with the iron oxide content shifting from 19.6% FeO, 6.3% $Fe_2O_3$ to 2.0% FeO, 25.9% $Fe_2O_3$. Under similar conditions of digestion in aqueous chromic acid (50% $CrO_3$, 110° C.), the ground ore before and after thermal oxidation shows the following dissolution rates:

|  | Percent dissolved after— | |
| --- | --- | --- |
|  | 6 hours | 24 hours |
| Original ore | 39 | 60 |
| Oxidized ore | 53 | 76 |

Preliminary oxidation is effectively carried out at temperatures above 500° C. up to 1200° C. and above to oxidize at least 40% of the contained ferrous iron to the ferric state. This usually requires a period of between 0.5 and 5.0 hours.

The dissolution rate falls off after about 6 hours at 110° C.

When the digestion is substantially complete, the silica and undissolved ore are separated by filtration, or other conventional means.

The ore liquor from the digestion step consists essentially of a solution of the dichromates of Cr(III), Fe(III), Al(III), and Mg(II) along with a relatively small concentration of "free" chromic acid. The Cr(III) represents the chromium from the ore plus a small amount produced by the reaction of chromic acid and ferrous iron in the ore.

The trivalent chromium (Cr(III)) is next oxidized to chromic acid (Cr(VI)). The oxidation can be effected chemically by adding an oxidizing agent, such as persulfuric acid or a persulfate salt, and maintaining the mixture at about 60–70° C. for about 3–5 hours.

Sodium, potassium, or ammonium persulfates may be used. The preferred salt is sodium persulfate, which should be added in excess of the stoichiometric amount. An excess of from 5 to 100% may be used, with 10 to 20% being preferred.

$$2Cr^{+++} + 3S_2O_8^{=} + 7H_2O = H_2Cr_2O_7 + 6HSO_4^- + 6H^+$$

This method introduces the foreign ion $HSO_4$ into the ore liquor which is not desirable.

The preferred method of oxidation is electrochemical:

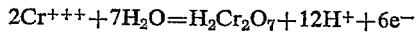
$$2Cr^{+++} + 7H_2O = H_2Cr_2O_7 + 12H^+ + 6e^-$$

Chlorates can also be used, but are even less desirable, for they not only are less efficient, but also introduce contaminating chloride ions into the liquor. The electrochemical oxidation is effected by feeding the ore liquor to the anode compartment of a cell provided with a diaphragm, separating anolyte and catholyte. The cell electrodes are preferably of lead, particularly the anode (the cathode may be constructed of other materials such as steel or graphite). The electrolysis is conducted at a low anode current density (of the order of about 10 to 30 amperes per square foot). An electrolyte temperature around 60 to 80° C. is preferred. If a single compartment electrolytic cell is used for the Cr(III) oxidation, a high cathode current density (e.g. of the order of 350–600 amperes per square foot) is preferred, otherwise, the cathode may be wrapped with a porous acid-resistant material such as asbestos to function as a diaphrgm separtor.

The ore liquor from the Cr(III) oxidation step consists essentially of a solution of the dichromates of iron, aluminum and magnesium; and chromic acid. The former may be considered as present in the form of cationic species, e.g. $Fe^{+++}$, $Al^{+++}$, and $Mg^{++}$ while the chromium is essentially anionic, e.g. $Cr_2O_7^{=}$. The separation of the chromium in the form of chromic acid from the other metals may therefore be effected by ion exchange with a strongly acidic cation exchange resin or liquids, e.g.:

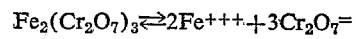
$$Fe_2(Cr_2O_7)_3 \rightleftharpoons 2Fe^{+++} + 3Cr_2O_7^{=}$$

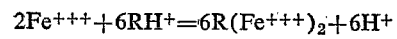
$$2Fe^{+++} + 6RH^+ = 6R(Fe^{+++})_2 + 6H^+$$

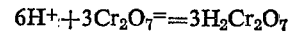
$$6H^+ + 3Cr_2O_7^{=} = 3H_2Cr_2O_7$$

where R represents the polystyrene or polyphenol part of a sulfonic acid resin or the alkyl-aryl moiety of a liquid sulfonic acid or dialkyl moiety of a liquid phosphoric acid ester.

When a resin is used, the oxidized ore liquor is preferably passed through a column of the resin whereupon the ions $Fe^{+++}$, $Al^{+++}$, and $Mg^{++}$ are adsorbed and retained on the resin and the effluent consists of aqueous chromic acid. When the resin has been loaded to its capacity, i.e. when significant amounts of iron, aluminum, or magnesium appear in the chromic acid effluent, the flow of ore liquor is stopped and the liquor in the column is washed out with water. The resin is then regenerated for continued use by stripping off the retained metals with an aqueous solution of a strong mineral acid such as 2 molar sulfuric acid or 3 molar hydrochloric acid. The eluate, which consists of a solution of iron, aluminum and magnesium salts, will contain little or no chromium and may be discarded. However, if the oxidation of trivalent chromium in the previous step has been incomplete, residual $Cr^{+++}$ will also adsorb on the resin and be found in the eluate. For this reason, the oxidation in the previous step should be as nearly complete as practical.

Examples of suitable resins are polystyrene sulfonic acids such as Dowex 50 (Dow Chemical Co.), Amberlite IR-120 (Rohm & Haas Co.), or phenolic polymer sulfonic acids such as Duolite C-10 (Diamond Shamrock Co.) or Zeocarb 215 (Permutit Co.). These resins are slowly degraded by the action of chromic acid, however, and a resin such as Amberlite 200 (Rohm & Haas Co.) is particularly to be preferred because it has a very high resistance to strong chromic acid solutions.

Alternately, the iron, aluminum and magnesium in the oxidized ore liquor may be removed by liquid-liquid extraction using certain strongly acidic liquid cation exchangers such as DNNSA (dinonyl naphthalene sulfonic acid) or moderately acidic liquid cation exchangers with chelating properties such as D2EHPA (di-2-ethylhexyl phosphoric acid).

Part of the chromic acid produced in the previous step is returned to the first (digestion) step of the proposed process; the remaining chromic acid (equivalent to the chromium in the dissolved ore) may be processed further by known technology to obtain (a) anhydrous chromic acid, $CrO_3$; (b) sodium dichromate (via sodium carbonate or hydroxide treatment):

$$H_2Cr_2O_7 + Na_2CO_3 = Na_2Cr_2O_7 + H_2O + CO_2$$

or (c) sodium chromate:

$$H_2Cr_2O_7 + 2Na_2CO_3 = 2Na_2CrO_4 + H_2O + 2CO_2$$

Since the earlier effluents from the ion exchange column are purer than the subsequent effluents up to the point where substantial amounts of iron, aluminum, and magnesium are breaking through the loaded resin column, it is advantageous to use the first cut for obtaining product and the later column cuts for recycle to the digestion step. In addition, sodium dichromate could be made from chromic acid contaminated with some iron, aluminum, and magnesium by adding the requisite amount of sodium carbonate or hydroxide and filtering off the precipitated metal hydrous oxides.

EXAMPLE 1

170 grams of ground (—200 mesh) Transvaal chrome ore containing 44.5% $Cr_2O_3$, 19.3% Fe, 15.4% $Al_2O_3$, and 10.7% MgO, is digested in a solution of 560 grams of chromic acid ($CrO_3$) in 560 grams of water. The mixture is stirred for 24 hours, during which period the temperature is maintained at 110° C. (the normal boiling point of 50% by wt., $CrO_3$ solution).

At the end of the digestion period, the silica and undissolved ore are separated by filtration through a glass fiber filter material. From the weight of the dried insolubles and its chromium content as determined by chemical analysis, the amount of ore which went into solution is estimated as 100 grams.

The filtered ore liquor (1200 grams) is diluted with 600 ml. of water to form 1370 ml. of electrochemical cell feed containing an estimated Cr(VI) concentration close to 400 grams per liter (g.p.l.), as $CrO_3$. A 675 ml. (886 grams) portion of the liquor is transferred into the anode compartment of an electrolytic cell provided with a lead anode of surface area of 53.5 cm.² The anode compartment dimensions are 19 cm. x 6 cm., liquor depth 6 cm. The anolyte is stirred magnetically. The anode and cathode compartments are separated by a cation exchange membrane (Ionac MC-347OXL). Ore liquor (315 ml.) is also charged into the cathode compartment which is provided with a lead cathode of 12.7 cm.² surface area.

The trivalent chromium in the anolyte is oxidized to chromic acid at a voltage averaging 8 volts and a constant current density of 2 amperes/dm.² The electrolysis is carried out at ambient temperature (25–30° C.). Current efficiency averages 47% during the oxidation of the first half of the Cr(III) content of the anolyte, and decreases to a lower value (30%) during the oxidation of the rest of the Cr(III).

A portion of oxidized ore liquor prepared as described above is adjusted for feeding to an ion exchange column by diluting with water to a Cr(VI) concentration corresponding to 200 g.p.l. $CrO_3$. The adjusted ion exchange feed contains 6.2 g.p.l. $Fe^{+++}$, 2.7 g.p.l. $Al^{+++}$, 2.1 g.p.l. $Mg^{++}$, and 200 g.p.l. $CrO_3$.

The solution is passed through a column of 90 ml. Amberlite 200 cation exchange resin in H+ form at a flow rate of 9 ml./minute. The resin bed dimensions are 50 cm. high x 1.5 cm. diameter. Analysis of the column effluents indicates that the first 90 ml. consists essentially of pure aqueous chromic acid, the next 90 ml. contains gradually increasing levels of Fe, Al, and Mg, and that complete breakthrough first occurs at about 4 bed volumes throughout (i.e. 350 ml.). The liquor in the column is displaced with water and the resin then stripped with 3 molar aqueous HCl to regenerate the column. Analyses of the eluate fractions emerging from the column indicates that all the adsorbed Fe, Al, and Mg are stripped off in 2 to 3 bed volumes. The total quantity of Fe, Al, and Mg in the combined eluates corresponds to 146 milliequivalents. Since 90 ml. of Amberlite 200 has a theoretical capacity of 158 milliequivalents (1.75 meq./liter of wet resin), the loading corresponds to 92% of the theoretical capacity.

EXAMPLE 2

In a run which is identical, except that the Transvaal chrome ore, after being pulverized to —200 mesh (U.S. Sieve Standard) is heated at 1,000° C. in air for 2 hours. 90% of the contained FeO is oxidized to $Fe_2O_3$. A 170 gram sample is treated as in Example 1.

At the end of the digestion period, the silica and undissolved ore are separated by filtration through a glass fiber filter material. From the weight of the dried insolubles and its chrome content as determined by chemical analysis, the amount of ore which went into solution is estimated as 130 grams, rather than 100 grams as in the case of Example 1 where the ore was not subjected to pre-oxidation.

Various modifications and alterations will become apparent to those skilled in the art without departing from the scope and spirit of the invention, and it should be understood that the latter is not necessarily limited to the aforementioned discussion.

We claim:

1. A process for solubilizing the chromium values of chrome ore comprising, digesting the ore in an aqueous chromic acid solution having a concentration between 25% and 65% by weight $CrO_3$ and containing as the sole solubilizing acid an amount of chromic acid at least equivalent to that required to form the dichromate salts of the chromium and other metal values in the ore, said solution being maintained during said digestion at a temperature within the range of 60° to 250° C.

2. The process of claim 1 wherein the amount of chromic acid present in the digestion solution is at least sufficient to form the dichromates of all the metal values present in the ore, and to oxidize any divalent iron present in the ore to the trivalent state.

3. The process of claim 1 wherein the amount of chromic acid present in the digestion solution is at least about 5% in excess of that required to form the dichromates of the metal values present in the ore, and to oxidize any divalent iron present in the ore to the trivalent state.

4. The process of claim 3 wherein the excess is from 5% to 20%.

5. The process of claim 1 wherein the chrome ore contains iron values and is subjected to oxidation in air prior to digestion to oxidize at least 40% of the contained ferrous iron to the ferric state.

6. The process of claim 1 wherein the digestion is carried out at superatmospheric pressure.

7. The process of claim 1 wherein the soluble dichromates of the metal values contained in the ore separated from the insoluble material contained therein, oxidizing the trivalent chromium values present in the separated solution to the hexavalent state, and recovering the chrome values, as chromic acid, from said oxidized solution.

8. The process of claim 7 wherein the separated solution is treated with a chemical oxidizing agent to oxidize the trivalent chromium to the hexavalent state.

9. The process of claim 8 wherein the oxidizing agent is selected from the group consisting of persulfuric acid and its sodium, potassium and ammonium salts, and is added in excess of the amount theoretically required to oxidize the contained trivalent chromium to the hexavalent state.

10. The process of claim 7 wherein the trivalent chromium in the separated solution is oxidized electrochemically to the hexavalent state by feeding the solution to the anode compartment of an electrolytic cell provided with a diaphragm separating the anolyte and catholyte, and subjecting the sodium to an electric current until the oxidation is substantially complete.

11. The process of claim 7 wherein the cations of the dichromates present in the oxidized solution, are removed by adsorption on the surface of a strongly acidic cation exchange resin.

12. The process of claim 7 wherein the cations of the dichromates present in the oxidized solution, are removed by liquid-liquid extraction using an acidic liquid cation exchanger.

13. The process of claim 7 wherein a portion of the chromic acid product is recycled to the digestion step, to furnish at least part of the chromic acid required.

References Cited
UNITED STATES PATENTS

| | | | |
|---|---|---|---|
| 2,574,065 | 11/1951 | Schulein | 423—607 |
| 322,011 | 7/1885 | Rowell | 423—607 |
| 2,601,306 | 6/1952 | Lloyd et al. | 204—89 |

FOREIGN PATENTS

| | | | |
|---|---|---|---|
| 118,265 | 12/1946 | Australia | 23—145 |
| 353,152 | 8/1931 | Great Britain | 23—145 |
| 974,448 | 11/1964 | Great Britain | 23—145 |

OSCAR R. VERTIZ, Primary Examiner

H. S. MILLER, Assistant Examiner

U.S. Cl. X.R.

75—26; 204—89; 423—139

PO-1050
(5/69)

UNITED STATES PATENT OFFICE
CERTIFICATE OF CORRECTION

Patent No. 3,787,555     Dated January 22, 1974

Inventor(s) Charles Patrick Bruen and Christian Albert Wamser

It is certified that error appears in the above-identified patent and that said Letters Patent are hereby corrected as shown below:

Claim 7. column 6, line 55, after "ore" insert --are--.

Claim 10, column 6, line 74, "sodium" should be --solution--.

Signed and sealed this 24th day of September 1974.

(SEAL)
Attest:

McCOY M. GIBSON JR.
Attesting Officer

C. MARSHALL DANN
Commissioner of Patents